(12) United States Patent
Padsalgi et al.

(10) Patent No.: US 10,289,628 B2
(45) Date of Patent: May 14, 2019

(54) SYSTEMS AND METHODS FOR ENTERPRISE-WIDE CONSISTENT DATA GENERATION

(71) Applicant: Tata Consultancy Services Limited, Mumbai (IN)

(72) Inventors: Moksha Sunil Padsalgi, Pune (IN); Ashim Roy, Pune (IN); Nikhil Girish Patwardhan, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 229 days.

(21) Appl. No.: 15/068,034

(22) Filed: Mar. 11, 2016

(65) Prior Publication Data

US 2017/0185659 A1  Jun. 29, 2017

(30) Foreign Application Priority Data

Dec. 29, 2015 (IN) .......................... 4914/MUM/2015

(51) Int. Cl.
| | | |
|---|---|---|
| *G06F 16/25* | (2019.01) | |
| *G06F 16/23* | (2019.01) | |
| *G06F 16/24* | (2019.01) | |

(52) U.S. Cl.
CPC .......... *G06F 16/25* (2019.01); *G06F 16/2365* (2019.01); *G06F 16/24* (2019.01)

(58) Field of Classification Search
CPC ....... G06F 16/2365; G06F 16/24; G06F 16/25
See application file for complete search history.

(56) References Cited

U.S. PATENT DOCUMENTS

| | | | |
|---|---|---|---|
| 5,649,190 A | 7/1997 | Sharif-Askary et al. | |
| 8,645,321 B1 | 2/2014 | Liu et al. | |
| 8,892,525 B2 | 11/2014 | Gorelik | |
| 2013/0054626 A1* | 2/2013 | Kuehler | G06F 16/254 707/756 |
| 2014/0040182 A1* | 2/2014 | Gilder | G06F 17/2264 707/602 |

* cited by examiner

*Primary Examiner* — Van H Oberly
(74) *Attorney, Agent, or Firm* — Finnegan, Henderson, Farabow, Garrett & Dunner LLP

(57) ABSTRACT

Systems and methods for consistent data generation across an enterprise involves explosion of seed data received in at least one of two or more databases present across the enterprise based on an identified reference data field in the received seed data and a pre-defined pattern. A lightweight map of key-value pairs is created wherein the key is data in the reference data field of at least one data record and the value is a pointer to a transformed value of either the data in the reference data field or at least one data field other than the reference data field, the transformed value being based on the pre-defined pattern. Based on the exploded seed data, the map is continually appended for further data explosion such that consistent data is generated across the enterprise.

9 Claims, 3 Drawing Sheets

SYSTEMS AND METHODS FOR ENTERPRISE-WIDE CONSISTENT DATA GENERATION

PRIORITY CLAIM

This U.S. patent application claims priority under 35 U.S.C. § 119 to: India Application No. 4914/MUM/2015 filed on 29 Dec. 2015. The entire contents of the aforementioned application are incorporated herein by reference.

TECHNICAL FIELD

The embodiments herein generally relate to data generation and more particularly, to enterprise-wide consistent data generation.

BACKGROUND

Enterprise-wide data management is a challenge that needs to be addressed at various levels. One of the critical scenarios is ensuring that an application works consistently across domains and geographies. Testing of an application deployed in various domains and geographies requires enterprise-wide consistent data generation to ensure consistent functioning of the deployed applications. It is a challenge to ensure data consistency during data generation across the enterprise. Also, it is imperative that the data consistency is ensured even when seed data across databases are not in sync.

SUMMARY

Embodiments of the present disclosure present technological improvements as solutions to one or more of the above-mentioned technical problems recognized by the inventors in conventional systems.

In an aspect, there is provided a processor implemented method for receiving seed data in at least one of two or more databases present across the enterprise; identifying a reference data field in the received seed data, the identified reference data field being associated with at least one data record comprising at least one data field other than the reference data field; and generating exploded seed data in the at least one of two or more databases based on the identified reference data field and a pre-defined pattern.

In an embodiment, the pre-defined pattern is one or more of (i) a pre-determined regular expression; (ii) a range of values; and (iii) specific pre-defined values.

In an embodiment, generating exploded seed data comprises creating a map of key-value pairs, and wherein the key is data in the reference data field of the at least one data record and the value is a pointer to a transformed value of either the data in the reference data field or the at least one data field in the at least one data record associated therein, the transformed value being based on the pre-defined pattern.

In an embodiment, the map is pre-defined and wherein generating exploded seed data comprises selecting a key-value pair from the pre-defined map.

In an embodiment, generating exploded seed data comprises continually appending the map with key-value pairs associated with the exploded seed data.

In another aspect, there is provided a system for consistent data generation across an enterprise, the system comprising: one or more internal data storage devices for storing instructions; and one or more processors operatively coupled to the one or more internal data storage devices, the one or more processors being configured by the instructions to: receive seed data in at least one of two or more databases present across the enterprise; identify a reference data field in the received seed data, the identified reference data field being associated with least one data record comprising at least one data field other than the reference data field; and generate exploded seed data in the at least one of two or more databases based on the identified reference data field and a pre-defined pattern.

In yet another aspect, there is provided a computer program product comprising a non-transitory computer readable medium having a computer readable program embodied therein, wherein the computer readable program, when executed on a computing device, causes the computing device to: receive seed data in at least one of two or more databases present across the enterprise; identify a reference data field in the received seed data, the identified reference data field being associated with least one data record comprising at least one data field other than the reference data field; and generate exploded seed data in the at least one of two or more databases based on the identified reference data field and a pre-defined pattern.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
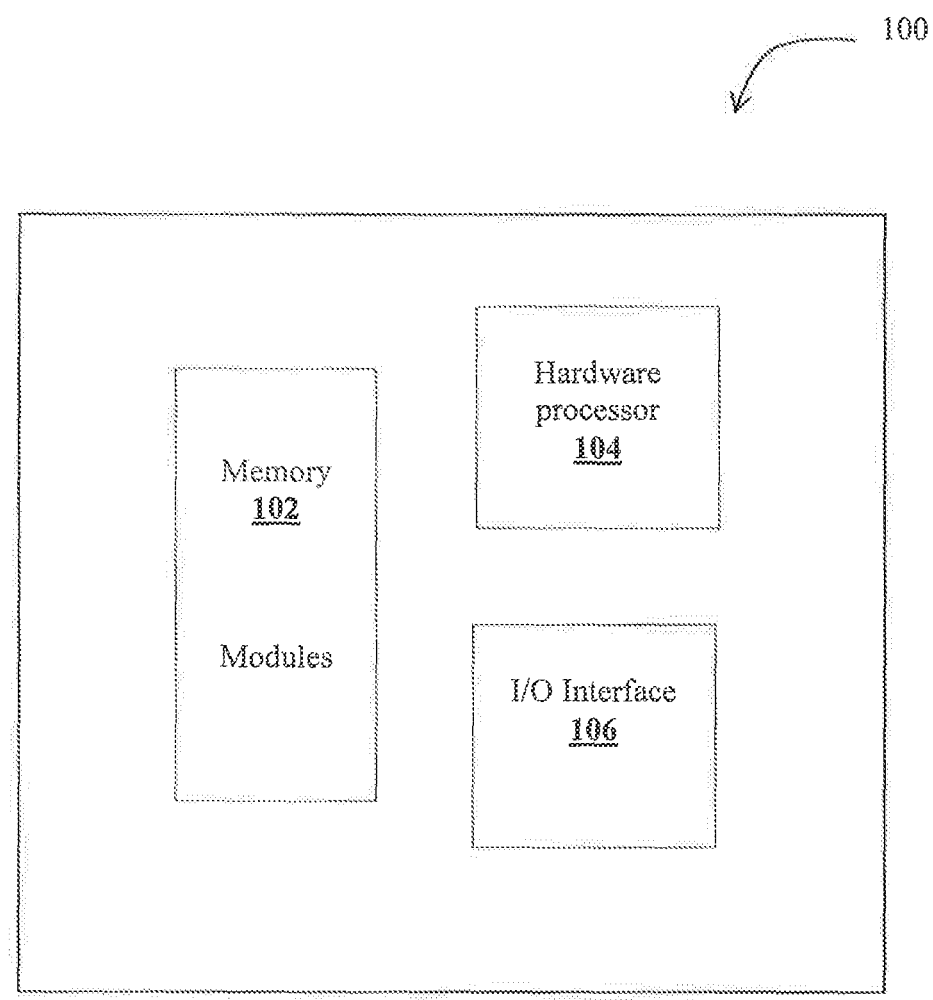
FIG. 1 illustrates a block diagram of a system for enterprise-wide consistent data generation according to an embodiment of the present disclosure.
Figure 2:
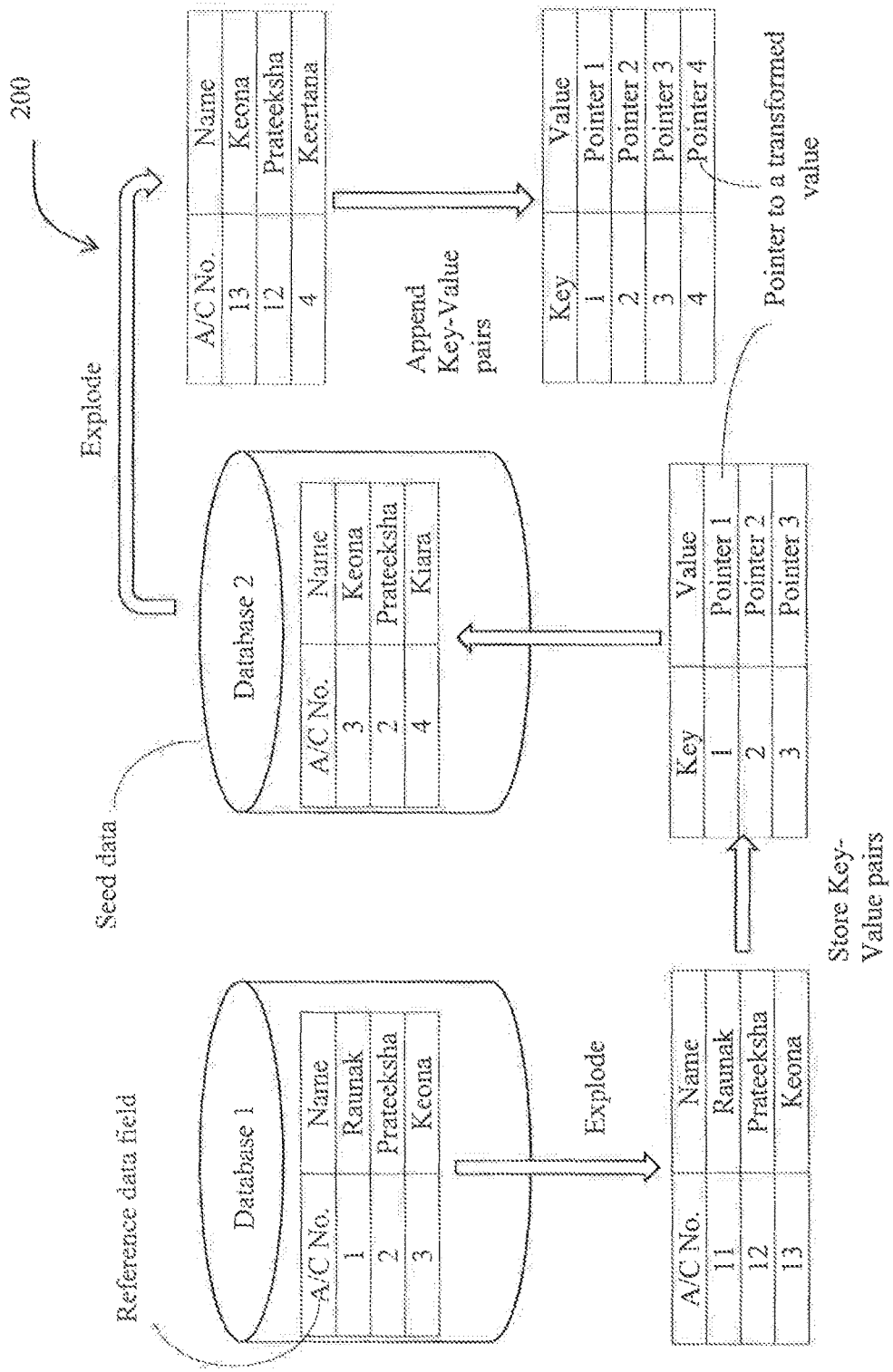
FIG. 2 is a simplified flow diagram showing creation of consistent data in accordance with an embodiment of the present disclosure.
Figure 3:
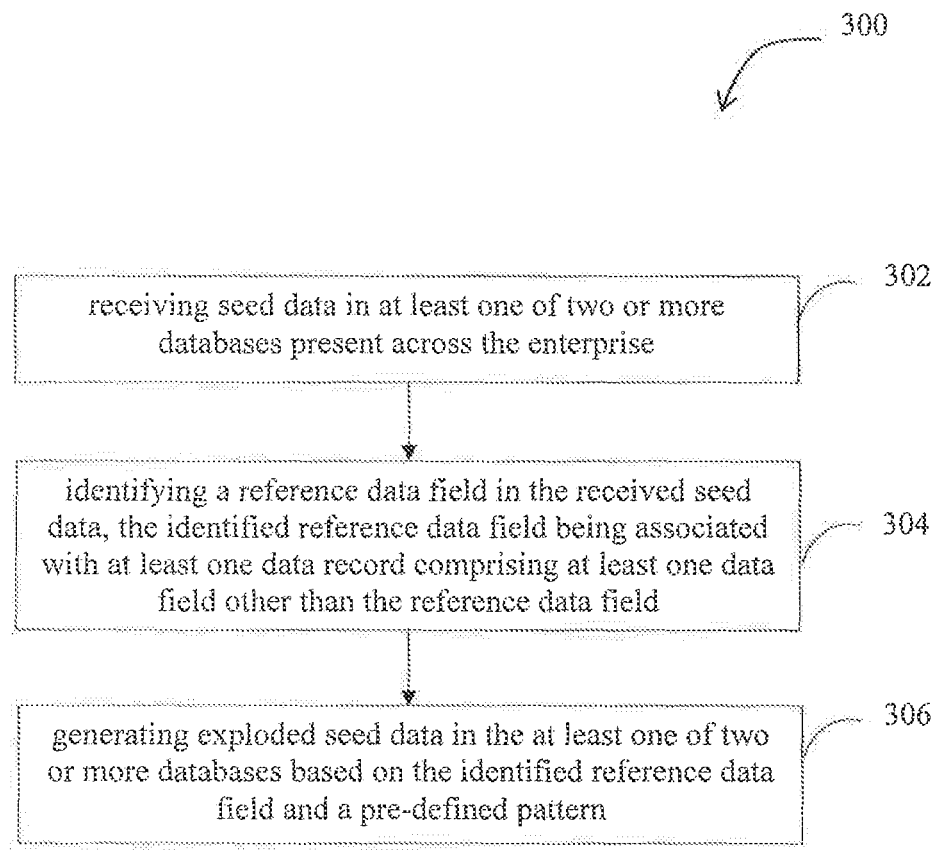
FIG. 3 illustrates a flow chart of a computer implemented method for enterprise-wide consistent data generation, in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and method.

FIG. 1 illustrates a block diagram of a system 100 for enterprise-wide consistent data generation according to an embodiment of the present disclosure. The system 100 comprises a memory 102, a hardware processor 104, and an input/output (I/O) interface 106. Although the exemplary block diagram and the associated description refers to a memory and a hardware processor, it may be understood that one or more memory units and one or more hardware processors may be comprised in the system 100. The memory 102 further includes one or more functional modules. The memory 102, the hardware processor 104, the input/output (I/O) interface 106, and/or the modules may be coupled by a system bus or a similar mechanism.

The memory 102, may store instructions, any number of pieces of information, and data, used by a computer system, for example the system 100 to implement the functions of the system 100. The memory 102 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, applications, instructions or the like for enabling the system 100 to carry out various functions in accordance with various example embodiments.

Additionally or alternatively, the memory 102 may be configured to store instructions which when executed by the hardware processor 104 causes the system 100 to behave in a manner as described in various embodiments. The memory 102 stores the functional modules and information, for example, received seed data, exploded data, maps of key-value pairs and the like.

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102. The hardware processor 104 may include circuitry implementing, among others, audio and logic functions associated with the communication. For example, the hardware processor 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 104 thus may also include the functionality to encode messages and/or data or information. The hardware processor 104 may include, among others a clock, an arithmetic logic unit (ALU) and logic gates configured to support operation of the hardware processor 104. Further, the hardware processor 104 may include functionality to execute one or more software programs, which may be stored in the memory 102 or otherwise accessible to the hardware processor 104.

FIG. 2 is a simplified exemplary flow diagram 200 showing creation of consistent data in accordance with an embodiment of the present disclosure. FIG. 3 illustrates a flow chart of a computer implemented method 300 for enterprise-wide consistent data generation, in accordance with an embodiment of the present disclosure. The steps of the method 300 of the present disclosure will now be explained with reference to the components of the system 100 as depicted in FIG. 1 and the flow diagram 200. The hardware processor 104 is configured by the instructions stored in the memory 102. The hardware processor 104 when configured by the instructions enables enterprise-wide consistent data generation as described hereinafter. For instance, when there are two or more databases situated across geographies or domains, the system 100 of the present invention enables generating data consistently without applying any constraint, All data need not be generated at the same time for the two or more databases. Data explosion can be executed in any order at any time. The system 100 and method 300 also facilitate enterprise-wide consistent data generation even when there is no relationship present between the two or more databases.

In an embodiment, at step 302, seed data is received in at least one of two or more databases present across the enterprise. As illustrated in the exemplary flow diagram 200, Database 1 can include seed data with say, three records representing Account Numbers (A/C No.) and Name of account holder. Also, Database 2 can include say, three records representing Account No (A/C No.) and Name of account holder wherein 2 data records are common with Database 1. It may be understood that the system 100 and method 300 of the present disclosure can facilitate consistent data generation even in the absence of common data records between the two or more databases.

In an embodiment, at step 304, a reference data field is identified in the seed data received in at least one of two or more databases present across the enterprise, In FIG. 2, the reference data field identified in Database 1 is the column including account numbers and there is one other data field representing the account holders' name.

In an embodiment, at step 306, the seed data is exploded in the at least one of two or more databases based on the identified reference data field and a pre-defined pattern. In FIG. 2, the seed data in Database 1 is exploded as shown wherein A/C No. 1 is A/C No. 11 with Account holder's name maintained as Raunak. In other words, the seed data was exploded wherein other data in the data record was maintained as in the seed data. Likewise, A/C No. 2 in the exploded data is A/C No. 12 with Account holder's name Prateeksha maintained same as in the seed data and so on. In an embodiment, the exploded seed data is based on a pre-defined pattern that can be one or more of (i) a pre-determined regular expression; (ii) a range of values; and (iii) specific pre-defined values. In FIG. 2, it can be noted that the account numbers in the exploded data are a +10 hop over that in the seed data. In an embodiment, a combination of patterns may be employed for generating the exploded data. For instance, in the case of exploding an IP address that requires a dot-decimal notation which consists of four decimal numbers separated by dots, a combination of patterns may be employed for generating each of the four decimal numbers and they can be combined using dots.

In an embodiment, the step 306 further includes creating a map of key value pairs wherein the key is data in the reference data field of the at least one data record and the value is a pointer to a transformed value of either the data in the reference data field or the at least one data field in the at least one data record associated therein, the transformed value being based on the pre-defined pattern. In FIG. 2, the key-value pairs associated with exploded data of Database 1 can be stored in a map such that for each account number representing a key, a pointer to the transformed value represents the value in the key value pair. For instance, for Account No. 3, a pointer 3 representing transformation of A/C No. 3 to A/C No. 13 can be stored as a value associated with key 3. This exemplary embodiment involves transformation of data comprised in the reference data field when the seed data is exploded. Key-value pairs for all transformed values are stored in the map based on the exploded data. In accordance with the present disclosure, the map is lightweight and enables quick and consistent data generation.

In an embodiment, the map is pre-defined and generating exploded data can include selecting a key-value pair from the pre-defined map. In FIG. 2, based on the exploded data of Database 1, a map has been pre-defined for Account numbers 1, 2 and 3, When exploding seed data of Database 2, the pre-defined map is referred and account numbers 2 and 3 are transformed based on the pointer 2 and pointer 3 associated with these account numbers in the pre-defined map. The record pertaining to Account 4 of Database 2 is exploded based on one or more pre-defined patterns and maybe transformed to Account 4 having account holder name Keertana. In this exemplary embodiment, the data comprised in a data field (Name) other than the reference data field (A/C No.) is transformed when the seed data is exploded.

In an embodiment, the step 306 further includes continually appending the map with key-value pairs associated with the exploded seed data. In FIG. 2, the key-value pair associated with transformation of data associated with A/C No. 4 was not part of the pre-defined map referred for the explosion of seed data of Database 2. Accordingly, the new key-value pair is appended to the map for further data explosion.

In an embodiment, the exploded seed data is in the form of a flat file having no structured inter-relationship to facilitate co-operation with the one or more databases in the enterprise for data explosion.

The embodiments of the present disclosure and the system 100 can be implemented in, but not limited to, a variety of computing systems, such as laptop computers, desktop computers, notebooks, workstations, mainframe computers, servers, network servers, cloud, hand-held devices and the like.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any, order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method for consistent data generation across an enterprise, the method comprising:
  receiving seed data in at least one of two or more databases present across the enterprise;
  identifying a reference data field in the received seed data, the identified reference data field being associated with at least one data record comprising at least one data field other than the reference data field; and
  generating exploded seed data in the at least one of two or more databases based on the identified reference data field and a pre-defined pattern, wherein generating exploded seed data comprises:
  creating a map of key-value pairs or referring a pre-defined map of key-value pairs, wherein a key in the key-value pair is data in the reference data field of the at least one data record and a value in the key-value pair is a pointer to a transformed value of either the data in the reference data field or the at least one data field in the at least one data record associated therein, and
  selecting a key-value pair from the map of the key-value pairs or the pre-defined map of the key-value pairs and transforming the data from the reference data field or the at least one data field other than the reference data field based on the pointer associated with the reference data field or the at least one data field respectively from the map or the pre-defined map, based on the pre-defined pattern, to generate the exploded seed data.

2. The processor implemented method of claim 1, wherein the pre-defined pattern is one or more of (i) a pre-determined regular expression; (ii) a range of values; and (iii) specific pre-defined values.

3. The processor implemented method of claim 1, wherein generating the exploded seed data comprises continually appending the map with the key-value pairs associated with the exploded seed data.

4. The processor implemented method of claim 1, wherein the consistent data generation across the enterprise is enabled also in absence of common data records between the two or more databases.

5. The processor implemented method of claim 1, wherein the data consistency is ensured even when the seed data across databases are not in sync.

6. A system for consistent data generation across an enterprise, the system comprising:
  one or more internal data storage devices for storing instructions; and
  one or more processors operatively coupled to the one or more internal data storage devices, the one or more processors being configured by the instructions to:
  receive seed data in at least one of two or more databases present across the enterprise;
  identify a reference data field in the received seed data, the identified reference data field being associated with least one data record comprising at least one data field other than the reference data field; and
  generate exploded seed data in the at least one of two or more databases based on the identified reference data field and a pre-defined pattern, wherein generating exploded seed data comprises:
  creating a map of key-value pairs or referring a pre-defined map of key-value pairs, wherein a key in the key-value pair is data in the reference data field of the at least one data record and a value in the key-value pair is a pointer to a transformed value of either the data in the reference data field or the at least one data field in the at least one data record associated therein, and
  selecting a key-value pair from the map of the key-value pairs or the pre-defined map of the key-value pairs and transforming the data from the reference data field or the at least one data field other than the reference data field based on the pointer associated with the reference data field or the at least one data field respectively from the map or the pre-defined map, based on the pre-defined pattern, to generate the exploded seed data.

7. The system of claim 6, wherein the pre-defined pattern is one or more of (i) a pre-determined regular expression; (ii) a range of values; and (iii) specific pre-defined values.

8. The system of claim 6, wherein the one or more processors are further configured to continually appending the map with the key-value pairs associated with the exploded seed data.

9. A computer program product comprising a non-transitory computer readable medium having a computer readable program embodied therein, wherein the computer readable program, when executed by a processor, on a computing device, causes the computing device to:
  receive seed data in at least one of two or more databases present across the enterprise;
  identify a reference data field in the received seed data, the identified reference data field being associated with least one data record comprising at least one data field other than the reference data field; and
  generate exploded seed data in the at least one of two or more databases based on the identified reference data field and a pre-defined pattern, wherein generating exploded seed data comprises:
  creating a map of key-value pairs or referring a pre-defined map of key-value pairs, wherein a key in the key-value pair is data in the reference data field of the at least one data record and a value in the key-value pair is a pointer to a transformed value of either the data in the reference data field or the at least one data field in the at least one data record associated therein, and
  selecting a key-value pair from the map of the key-value pairs or the pre-defined map of the key-value pairs and transforming the data from the reference data field or the at least one data field other than the reference data field based on the pointer associated with the reference data field or the at least one data field respectively from the map or the pre-defined map, based on the pre-defined pattern, to generate the exploded seed data.

* * * * *